United States Patent
Chung et al.

(10) Patent No.: US 9,527,503 B2
(45) Date of Patent: Dec. 27, 2016

(54) ACTIVE VIBRATION REDUCTION CONTROL APPARATUS AND METHOD OF HYBRID VEHICLE

(71) Applicants: Hyundai Motor Company, Seoul (KR); Kia Motors Corporation, Seoul (KR)

(72) Inventors: Tae Young Chung, Gyeonggi-do (KR); Hyung Bin Ihm, Seoul (KR); Hyung Souk Kang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/729,779

(22) Filed: Jun. 3, 2015

(65) Prior Publication Data

US 2016/0159340 A1 Jun. 9, 2016

(30) Foreign Application Priority Data

Dec. 9, 2014 (KR) .................. 10-2014-0176052

(51) Int. Cl.
*B60W 20/17* (2016.01)
*B60L 15/20* (2006.01)
(Continued)

(52) U.S. Cl.
CPC ............... *B60W 20/17* (2016.01); *B60K 6/48* (2013.01); *B60L 3/0023* (2013.01); *B60L 15/20* (2013.01);
(Continued)

(58) Field of Classification Search
CPC ............ B60W 20/17; B60W 2710/083; B60W 2520/00; B60W 2510/06; B60W 30/20; B60W 10/08; B60W 20/00; B60W 2030/206; B60W 2050/0014; B60W 2510/081; B60W 2050/0052; B60L 15/20; B60L 3/0023; B60K 6/48; Y10S 903/906
(Continued)

(56) References Cited

U.S. PATENT DOCUMENTS 7,633,257 B2   12/2009   Sakamoto et al.
8,381,579 B2   2/2013    Sato et al.
(Continued)

FOREIGN PATENT DOCUMENTS

JP   2007-269049 A   10/2007
JP   2011-137527 A   7/2011
(Continued)

OTHER PUBLICATIONS

Extended European Search Report for European Patent Application No. 15170526.6, dated Apr. 29, 2016, 10 pages.
(Continued)

*Primary Examiner* — Brian P Sweeney
(74) *Attorney, Agent, or Firm* — Mintz Levin Cohn Ferris Glovsky and Popeo, P.C.; Peter F. Corless

(57) ABSTRACT

An active vibration reduction control apparatus and method of a hybrid vehicle are provided to generate a reference signal of a first motor that corresponds a vibration signal extracted from a second motor. An amplitude and phase of the reference signal is adjusted based on frequency characteristic of a drive system transfer function to generate vibration reduction torque of a first motor within the hybrid vehicle. The first motor, a torsional damper, an engine, a connector (a belt-pulley, a chain, a gear, and so on), and the second motor are sequentially connected within the hybrid vehicle.

15 Claims, 7 Drawing Sheets

(51) Int. Cl.
*B60L 3/00* (2006.01)
*B60K 6/48* (2007.10)
*B60W 10/08* (2006.01)
*B60W 20/00* (2016.01)
*B60W 30/20* (2006.01)
*B60W 50/00* (2006.01)

(52) U.S. Cl.
CPC .............. *B60W 10/08* (2013.01); *B60W 20/00* (2013.01); *B60W 30/20* (2013.01); *B60W 2030/206* (2013.01); *B60W 2050/0014* (2013.01); *B60W 2050/0052* (2013.01); *B60W 2510/06* (2013.01); *B60W 2510/081* (2013.01); *B60W 2520/00* (2013.01); *B60W 2710/083* (2013.01); *Y10S 903/906* (2013.01)

(58) Field of Classification Search
USPC .......................................................... 701/22
See application file for complete search history.

(56) References Cited

U.S. PATENT DOCUMENTS

| | | |
|---|---|---|
| 9,008,941 B2 | 4/2015 | Park et al. |
| 2009/0054190 A1 | 2/2009 | Kim et al. |
| 2011/0048118 A1 | 3/2011 | Sato et al. |
| 2011/0112709 A1* | 5/2011 | Park ................ B60K 6/448 701/22 |
| 2012/0078456 A1 | 3/2012 | Hakumura et al. |
| 2015/0012160 A1* | 1/2015 | Tsutsumi ............ B60L 15/20 701/22 |
| 2015/0263657 A1 | 9/2015 | Park et al. |

FOREIGN PATENT DOCUMENTS

| | | |
|---|---|---|
| JP | 5522037 B2 | 6/2014 |
| KR | 10-2010-0064603 A | 6/2010 |
| KR | 10-0974752 B1 | 8/2010 |
| KR | 10-1000410 B1 | 12/2010 |
| KR | 10-2011-0049934 A | 5/2011 |

OTHER PUBLICATIONS

Kovacevic, Z. et al. "Adaptive Digital Filters" (Jun. 21, 2013) pp. 31-73.

* cited by examiner

ACTIVE VIBRATION REDUCTION CONTROL APPARATUS AND METHOD OF HYBRID VEHICLE

CROSS-REFERENCE TO RELATED APPLICATION

This application is based on and claims the benefit of priority to Korean Patent Application No. 10-2014-0176052, filed on Dec. 9, 2014 in the Korean Intellectual Property Office, the disclosure of which is incorporated herein in its entirety by reference.

TECHNICAL FIELD

The present disclosure relates to an active vibration reduction control apparatus and method of a hybrid vehicle, and more particularly, to technology for extracting a vibration signal (a vibration component) transferred via a drive system (a powertrain) during explosion stroke of an internal combustion engine and applying antiphase torque of the extracted vibration signal to a motor installed within the drive system to actively reduce vibration generated due to engine explosion.

BACKGROUND

A hybrid vehicle refers to a type of environmentally-friendly vehicle that is driven by efficiently combining two or more types of different power sources, and in general, refers to a vehicle that is driven by an engine for combusting fuel (e.g., fossil fuel such as gasoline) to obtain rotatory power and an electric motor for obtaining rotatory power using battery power.

An engine generates rotatory power by combustion pressure during cylinder explosion stroke. In particular, engine torque contains a vibration component proportional to a number of cylinder explosions per axis rotation due to change in combustion pressure. The vibration component is transmitted to a vehicle body via an engine mount and a drive shaft to cause vibration and noise, thereby causing uncomfortable ride to a driver.

A method (a first method) of changing an engine operating point to avoid a vibration generating range a method (a second method) of reducing vibration using low stiffness of a torsional damper, and a method (a third method) of changing a resonance region by installing a dynamic damper have been developed. However, in the first method an optimum operating point is deviated from, in the second method a low vibration decreases effect due to restriction of low stiffness, and in the third method fuel consumption is degraded due to weight increase and manufacturing costs are increased due to generation of additional expenses.

SUMMARY

The present disclosure provides an active vibration reduction control apparatus and method of a hybrid vehicle, for generating a reference signal (e.g., a unit sine wave) of a first motor that follows a vibration signal extracted from a second motor and then adjusting an amplitude and phase of the reference signal based on frequency characteristic of a drive system transfer function to generate vibration reduction torque of a first motor within a hybrid vehicle in which the first motor, a torsional damper, an engine, a connector (e.g., a belt-pulley, a chain, a gear, and so on), and the second motor may be sequentially connected.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

According to an exemplary embodiment of the present disclosure, an active vibration reduction control apparatus of a hybrid vehicle in which a first motor, a torsional damper, an engine, a connector, and a second motor are sequentially connected may include a vibration extraction unit configured to extract a vibration signal from the second motor, a reference signal generation unit configured to generate a reference signal and a phase based on a rotation angle of the first motor, a coefficient determination unit configured to determine a filter coefficient for minimizing a phase difference between the generated reference signal and the extracted vibration signal, a phase determination unit configured to detect the phase difference between the reference signal and the vibration signal using a velocity signal of the first motor and the determined filter coefficient, a phase shift amount operation unit configured to operate a phase for compensating for delay, an antiphase signal generation unit configured to generate an antiphase signal using the phase generated by the reference signal generation unit, the phase detected by the phase determination unit, and the phase operated by the phase shift amount operation unit, and a torque generation unit configured to multiply the antiphase signal by a reference torque to generate antiphase torque and then to combine the antiphase torque and command torque to generate vibration reduction torque.

According to another exemplary embodiment of the present disclosure, an active vibration reduction control method of a hybrid vehicle in which a first motor, a torsional damper, an engine, a connector, and a second motor are sequentially connected may include extracting a vibration signal from the second motor; generating a reference signal and a phase based on a rotation angle of the first motor; determining a filter coefficient for minimizing a phase difference between the generated reference signal and the extracted vibration signal; detecting the phase difference between the reference signal and the vibration signal using a velocity signal of the first motor and the determined filter coefficient; operating a phase for compensating for delay; generating an antiphase signal using the generated phase, the detected phase, and the operated phase; and multiplying the antiphase signal by reference torque to generate antiphase torque and then combining the antiphase torque and command torque to generate vibration reduction torque, by a torque generation unit.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
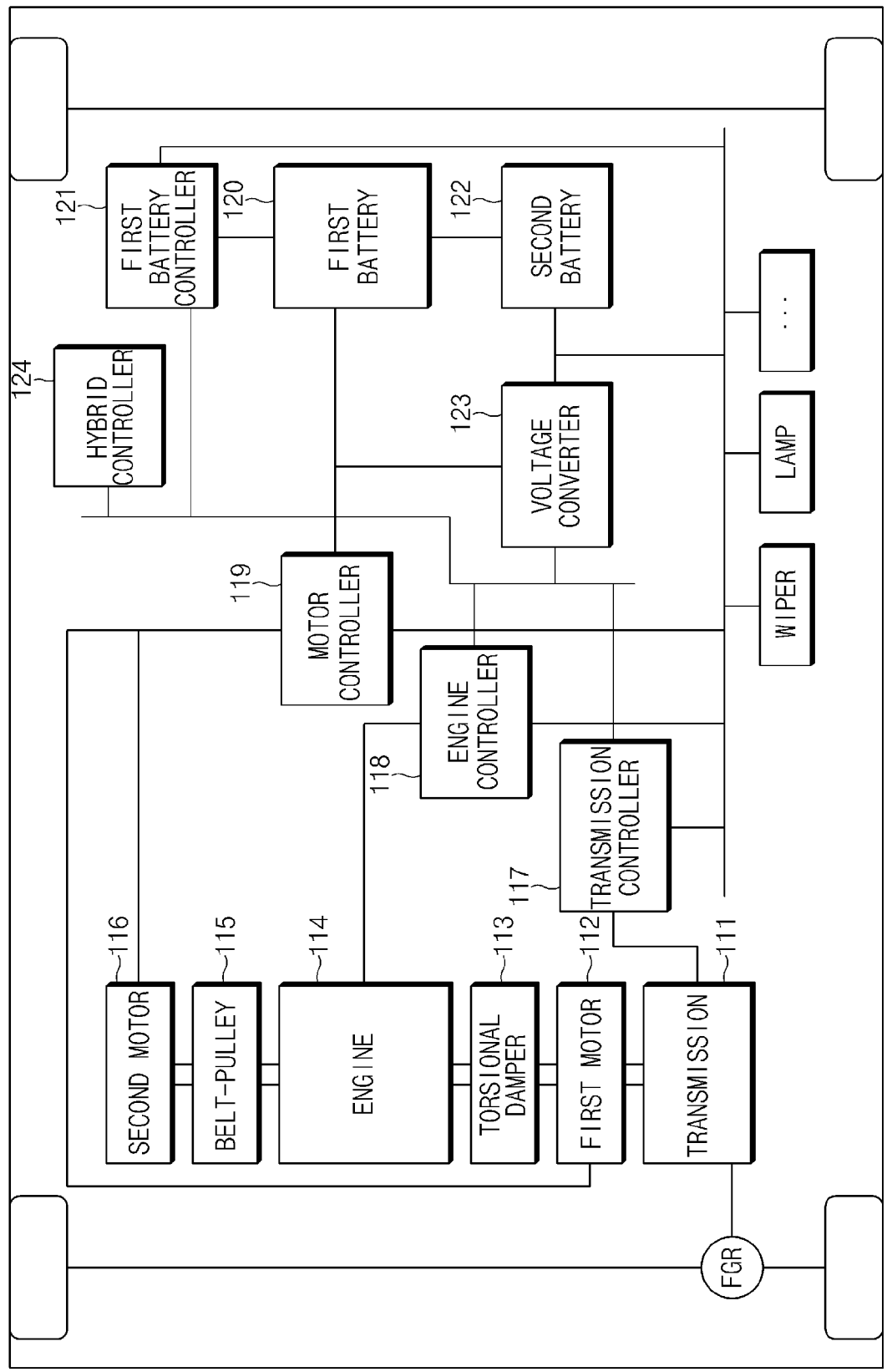
FIG. 1 is an exemplary diagram of a hybrid vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present disclosure are described in detail so as for those of ordinary skill in the art to more easily implement with reference to the accompanying drawings to clarify aspects, features and advantages of the present disclosure. In the description of the present disclosure, certain detailed explanations of related art are omitted when it is deemed that they may unnecessarily obscure the essence of the disclosure. Hereinafter, the present disclosure will be described more fully with reference to the accompanying drawings, in which exemplary embodiments of the disclosure are shown.

FIG. 1 is an exemplary diagram of a hybrid vehicle to which an exemplary embodiment of the present disclosure is applied. As illustrated in FIG. 1, the hybrid vehicle to which the present disclosure is applied may be a transmission-mounted electric device (TMED) type of hybrid vehicle in which an engine 114 and a first motor 112 are connected via a torsional damper 113 and a drive system of the hybrid vehicle may include a transmission 111, the first motor 112, the torsional damper 113, the engine 114, a belt-pulley 115, a second motor 116, a transmission control unit (TCU) 117, an engine control unit (ECU) 118, a motor control unit (MCU) (including an inverter) 119, a first battery 120, a first battery management system (BMS) 121, a second battery 122, a voltage converter 123, a hybrid control unit (HCU) 124, and so on. The various components of the drive system may be executed by a central controller having a processor and a memory.

In particular, the first motor 112 may be connected to the engine 114 via the torsional damper 113 and an engine clutch (not shown) and may be configured to drive a vehicle based on a high voltage from the first battery 120, and in particular, may operate as a component configured to reduce vibration according to the present disclosure. In other words, the first motor 112 may be configured to prevent vibration from being transmitted to a terminal of the transmission 111.

The second motor 116 may be connected to the engine 114 via the belt-pulley 115 and may be configured to charge the first battery 120 using power of the engine 114 or supply power to the first motor 112. The first BMS 121 may be configured to manage the first battery 120 that supplies a high voltage. The second battery 122 may be configured to supply power to an electric field load. The voltage converter 123 may be configured to convert a voltage of the first battery 120 to a rated voltage of the second battery 122.

The HCU 124 may be configured to operate a vehicle to determine an operating point of the vehicle, and so on. In addition, the HCU 124 may be considered as an uppermost controller (e.g., an overall control) configured to operate each controller within the system, setting of hybrid driving mode, and overall operation of a vehicle. In this regard, the aforementioned controllers may be connected via a high speed CAN communication line in terms of the HCU 124 as an uppermost controller to allow the uppermost controller to transmit a command to a lower controller while exchanging information between the controllers.

Hereinafter, additional explanation will be given for clear understanding of the points of the present disclosure. Antiphase recognition as core technology for active vibration reduction control of a hybrid vehicle according to the present disclosure is achieved using the frequency response characteristic of a drive system. Application of vibratory force to the drive system to generate vibration may be modeled as a system transfer function and an amplitude and phase relation between input and output vibration may be represented based on frequency response of the transfer function.

The vibratory force generated by an engine may be transmitted to each component connected to the drive system to generate vibration at each part. Accordingly, separate transfer functions may be present in respective transfer paths, and an amplitude and phase difference of vibration of each part may be different from those of a vibration source and may be determined based on a parameter of a mechanical system, such as inertia moment, stiffness, a damping factor, and so on. Vibration may be offset at a target portion to reduce vibration by adjusting antiphases between vibratory force (or vibration) corresponding to engine vibratory force transferred and applied to the reduction target portion and vibratory force (or compensation force) corresponding to motor generating force transferred and applied to the target portion.

Further, vibrations measured at a specific portion of the drive system, engine vibratory force, and vibrations of the vibration reduction target portion may have a respective predetermined frequency response relation, and thus antiphases of the target portion may be estimated using the frequency response characteristic of the drive system.

Predetermined frequency response, that is, phase and amplitude difference are present between engine vibratory force and a vibration component of velocity extracted by filtering velocity measured by differentiating (or via a observer) a position signal (e.g., a position of a motor rotor) of the second motor 116 and predetermined frequency response is present up to a vibration reduction target portion (a first motor) from the engine vibratory force, and thus a predetermined frequency response relation may be present between the measured vibration signal and the target portion. In addition, a predetermined frequency relation is also present up to the target portion from motor generating force, and thus a predetermined frequency response relation may also be satisfied between extracted vibration signal and compensation force to be generated by a motor for antiphase vibration reduction at the target portion.

In addition, to determine the vibration reduction target portion and the compensation force of the first motor 112, for reducing vibration, the aforementioned hybrid vehicle may be configured to generate a reference signal synchronized with a vibration signal extracted from a velocity signal of the second motor 116 and perform amplitude adjustment and phase shift based on the frequency characteristic of the pre-recognized drive system transfer function to determine compensation force of antiphase for vibration reduction. In particular, the amplitude of compensation force may be determined using engine torque provided by an engine controller.

According to the present disclosure, antiphase recognition may be achieved using frequency response of the drive system transfer function and may use a transfer function up to a vibration reduction target portion from a point to which a sensor for extraction of vibration is attached. This process will be described herein below. A sinusoidal vibration component may be extracted from velocity (or position) information measured by the sensor and then a sine wave, and an amplitude and phase of which may be adjusted by as much as frequency response, that is, amplitude response and phase response of a transfer function of a corresponding path, may be generated to estimate a sine wave that corresponds to acting force transmitted to the vibration measurement portion. Then when torque is generated using the first motor by as much as adjustment and reversal of amplitude and phase of the estimated acting force of the estimated sine wave according to the transfer function to the vibration reduction target portion, vibration of the target portion may be offset. The antiphase adjustment process according to the present disclosure may not use a filter in the time domain and may be performed in the frequency domain via a process of combining phases with respect to a position angle of a reference signal.

Figure 2:
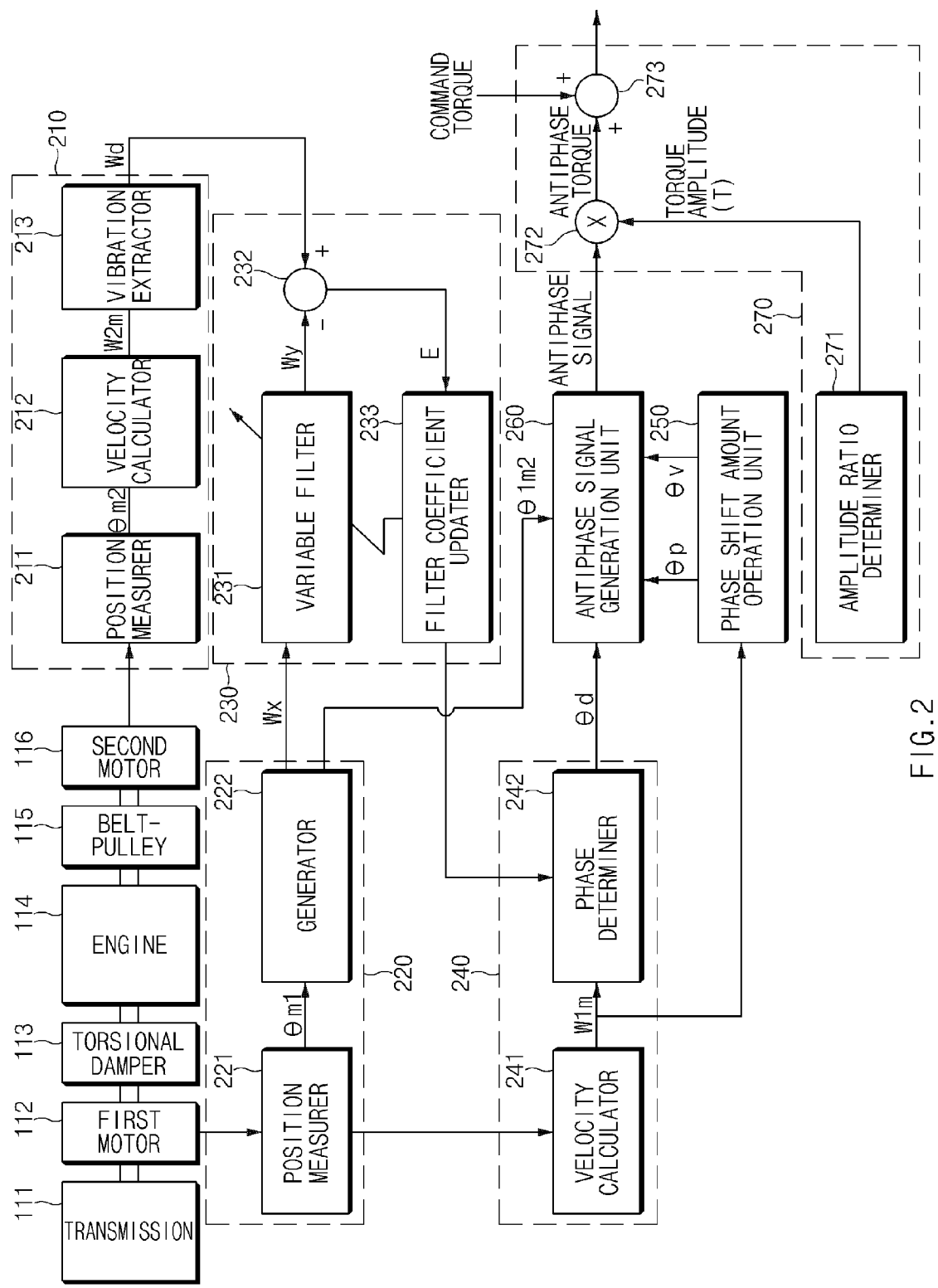
FIG. 2 is an exemplary diagram illustrating a structure of an active vibration reduction control apparatus of a hybrid vehicle according to an exemplary embodiment of the present disclosure.

FIG. 2 is an exemplary diagram illustrating a structure of an active vibration reduction control apparatus of a hybrid vehicle according to an exemplary embodiment of the present disclosure. As illustrated in FIG. 2, the active vibration reduction control apparatus of the hybrid vehicle according to the present disclosure may include a vibration extraction unit 210, a reference signal generation unit 220, a coefficient determination unit 230, a phase determination unit 240, a phase shift amount operation unit 250, an antiphase signal generation unit 260, and a torque generation unit 270.

The aforementioned components will be described in detail herein below. First, according to the present disclosure, the vibration extraction unit 210 may be configured to extract a vibration signal (e.g., vibration component) from the operating second motor 116. As described above, when the torsional damper 113 is positioned between the first motor 112 to reduce vibration and the engine 114 configured to generate vibration, since vibration generated by engine explosion may be reduced substantially while passing through the torsional damper 113, it may be difficult to extract a vibration signal from the first motor 112, and thus the vibration signal generated by engine explosion may be extracted from the second motor 116.

The vibration extraction unit 210 may include a position measurer (e.g., resolver) 211 configured to measure a position (hereinafter, a rotation angle) of a rotor in the second motor 116, a velocity calculator 212 to differentiate the rotation angle ($\theta m2$) measured by the position measurer 211 to calculate a velocity signal, and a vibration extractor 213 configured to filter the velocity signal calculated by the velocity calculator 212 to extract a vibration signal.

The vibration extractor 213 may be embodied as a band-pass type of digital filter configured to pass a vibration component generated by engine explosion. In particular, a cutoff frequency of the digital filter may be used by pre-determining a desired region and may be changed and used based on revolution per minute of an engine. For example, a 4-stroke 4-cycle internal combustion engine explodes twice for every mechanical revolution, and thus a frequency explosion component that corresponds to double engine rotation velocity may be observed and cutoff frequency may be determined based on this frequency explosion component.

Then, the reference signal generation unit 220 may be configured to generate a reference signal based on a rotation angle (e.g., phase) of the first motor 112. In other words, a unit sine wave with a size of 1 may be generated as the reference signal. In addition, the reference signal generation unit 220 may be configured to generate a result (hereinafter double rotation angle) obtained by multiplying the rotation angle of the first motor 112 by 2. Particularly, since a 4-stroke 4-cycle internal combustion engine that explodes twice for every revolution of a crank shaft is exemplified, 2 may be multiplied, but this value may be changed based on an internal combustion engine.

The reference signal generation unit 220 may include a position measurer (e.g., resolver) 221 configured to measure a rotation angle of the first motor 112 and a generator 222 configured to generate a double rotation angle and a reference signal based on the rotation angle measured by the position measurer 221. Further, the coefficient determination unit 230 may be configured to determine a filter coefficient to minimize a phase difference between the reference signal generated by the reference signal generation unit 220 and the vibration signal extracted by the vibration extraction unit 210. Particularly, the reference signal generated by the reference signal generation unit 220 and the vibration signal extracted by the vibration extraction unit 210 may have about the same frequency.

The coefficient determination unit 230 may include a variable filter 231, a phase difference calculator 232, and a filter coefficient updater 233. Further, finite impulse response (FIR) or infinite impulse response (IR) type of the variable filter 231 may be configured to filter a reference signal Wx generated by the reference signal generation unit 220 using the filter coefficient updated by the filter coefficient updater 233. In particular, a result (Wy) obtained via filtering using an FIR filter is represented using Equation 1 below.

$$W_y = H(z)W_x, \quad H(z) = b_1 z^{-1} + b_0 \qquad \text{Equation 1}$$

wherein, H(z) refers to an FIR filter. $b_0$ and $b_1$ denotes the filter coefficient.

According to an exemplary embodiment of the present disclosure, a primary variable filter has been exemplified, but two or more may be used as an order of a variable filter as necessary. The phase difference calculator 232 may be configured to calculate a phase difference between the reference signal generated by the reference signal generation unit 220 and the vibration signal extracted by the vibration extraction unit 210. The filter coefficient updater 233 may be configured to calculate a filter coefficient $b_0$, $b_1$ . . . for minimizing the phase difference between the reference signal generated by the reference signal generation unit 220 and the vibration signal extracted by the vibration extraction unit 210 using an algorithm of a recursive lease square (RLS) method.

When an output cut-off unit (not shown) such as a clutch is positioned between the first motor 112 and the engine 114, the filter coefficient updater 233 may be configured to stop updating coefficient when output is cut off and may be configured to update the coefficient when the output is connected. Then, the phase determination unit 240 may be configured to differentiate a rotation angle of the first motor 112, measured by the position measurer 221, to calculate a velocity signal and detect a phase difference between the reference signal generated by the reference signal generation unit 220 and the vibration signal extracted by the vibration extraction unit 210 using the coefficient determined based on the calculated velocity signal and the coefficient determination unit 230.

The phase determination unit 240 may include a velocity calculator 241 configured to differentiate a rotation angle of the first motor 112, measured by the position measurer 221, to calculate a velocity signal, and a phase determiner 242 configured to detect a phase difference between the reference signal generated by the reference signal generation unit 220 and the vibration signal extracted by the vibration extraction unit 210 using the velocity signal calculated by the velocity calculator 241 and the coefficient determined by the coefficient determination unit 230. In particular, the phase determiner 242 may be configured to determine a phase difference $\theta_d$ using Equation 2 below.

$$\theta_d = \angle H(e^{jwT_s}) = \tan^{-1} \frac{-b_1 \sin(wT_s)}{b_0 + b_1 \cos(wT_s)} \qquad \text{Equation 2}$$

wherein, $b_0$ and $b_1$ denotes a filter coefficient, and w denotes a angular speed, and Ts denotes a sampling time.

Furthermore, the phase shift amount operation unit 250 may be configured to operate a compensation value $\theta_p$ for compensating for a phase difference due to a transfer delay up to the first motor 112 from the vibration extractor 213. In addition, the phase shift amount operation unit 250 may further be configured to adjust a compensation value $\theta_v$ for compensating for a phase delay generated by the vibration extractor 213. The phase delay refers to a phase delay that occurs due to the vibration extractor 213, that is, a band-pass filter.

Then, the antiphase signal generation unit 260 may be configured to generate an antiphase signal using a phase $\theta 1m2$ generated by the reference signal generation unit 220, a phase $\theta_d$ detected by the phase determination unit 240, and a compensation value $\theta_p$ adjusted by the phase shift amount operation unit 250. The torque generation unit 270 may then be configured to multiply the antiphase signal generated by the antiphase signal generation unit 260 by reference torque to generate antiphase torque and then combine the antiphase torque and command torque to generate vibration reduction torque. Particularly, the reference torque may be a pre-set constant, a predetermined ratio of total torque applied to an engine torque or a drive system, or a value obtained by multiplying total torque applied to the engine torque or the drive system by an amplitude ratio in the frequency domain.

Figure 3:
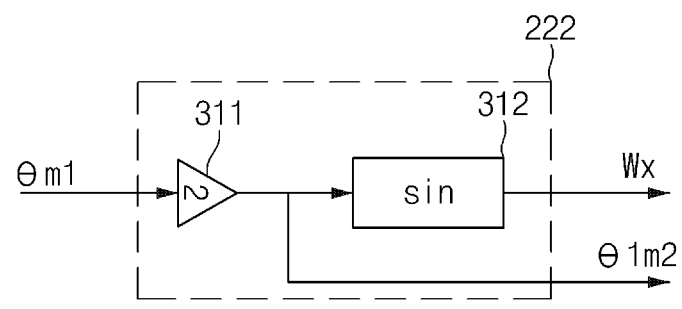
FIG. 3 is an exemplary diagram illustrating a structure of a generator in detail according to an exemplary embodiment of the present disclosure.

FIG. 3 is an exemplary diagram illustrating a structure of the generator in detail according to an exemplary embodiment of the present disclosure. As illustrated in FIG. 3, the generator 222 according to the present disclosure may include a calculator 311 configured to multiple a rotation angle $\theta m1$ of the first motor 112, measured by the position measurer 221 by 2, to calculate a double rotation angle, and a reference signal generator 312 configured to generate a reference signal (e.g., a unit sine wave) using the double rotation angle calculated by the calculator 311.

In particular, the calculator 311 may be configured to multiple a number of explosions during one rotation corresponding to a multiple based on the stroke and cycle of an internal engine. For example, in the case of 4-stroke 4-cycle internal engine, 2 may be multiplied. The calculator 311 may be configured to filter velocity of the first motor 112 via a low-pass type of digital filter and then multiply a multiple based on stroke of an internal engine. In addition, the reference signal generator 312 may be configured to use a sin signal that contains harmonic to which a component generated by engine explosion is reflected to reduce error and displacement in error.

Figure 4:
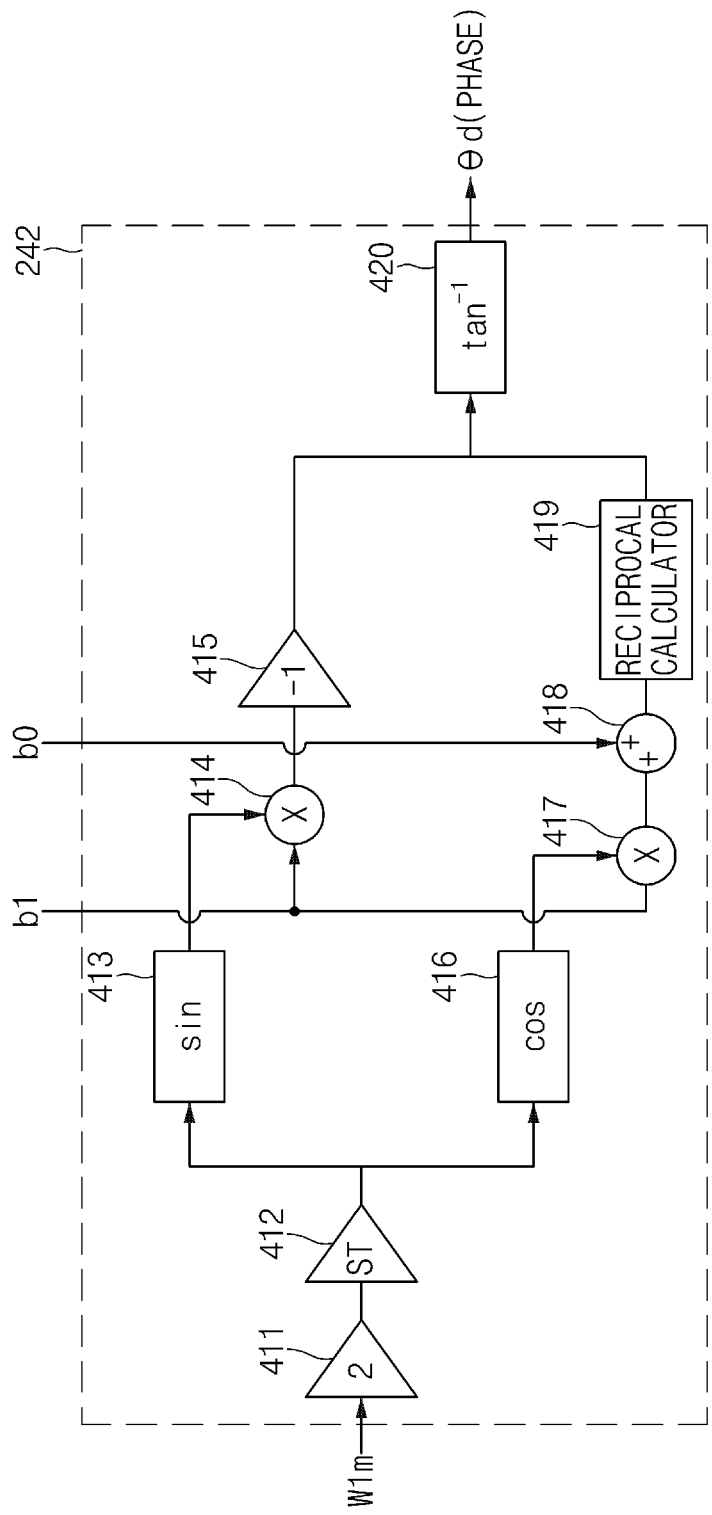
FIG. 4 is an exemplary diagram illustrating a structure of a phase determination unit in detail according to an exemplary embodiment of the present disclosure.

FIG. 4 is an exemplary diagram illustrating a structure of the phase determination unit in detail according to an exemplary embodiment of the present disclosure. As illustrated in FIG. 4, the phase determiner 242 according to the present disclosure may include a first multiplier 411, a sample time (ST) 412, a first calculator 413, a second multiplier 414, a third multiplier 415, a second calculator 416, a fourth multiplier 417, an adder 418, a reciprocal calculator 419, and an arc tangent calculator 420.

The first multiplier 411 may be configured to multiple a velocity signal calculated by the velocity calculator 241 by 2. The ST 412 is a type of multiplier that may be configured to multiply output of the first multiplier 411 by a sample time (ST). The first calculator 413 may be configured to combine a sine wave to an output of the ST 412 and the second multiplier 414 may be configured to multiply an output of the first calculator 413 by a coefficient $b_1$. The third multiplier 415 may be configured to multiply an output of the second multiplier 414 by −1. Further, the second calculator 416 may be configured to combine a cosine wave to the output of the ST 412. The fourth multiplier 417 may be configured to multiply and output of the second calculator 416 by a coefficient $b_1$. The adder 418 may then be configured to combine (e.g., add or sum) a coefficient $b_0$ to the output of the fourth multiplier 417. The reciprocal calculator 419 may be configured to calculate a reciprocal of the output of the adder 418. The arc tangent calculator 420 may then be configured to calculate arc tangent with respect to the output of the third multiplier 415 and the output of the reciprocal calculator 419.

Figure 5:
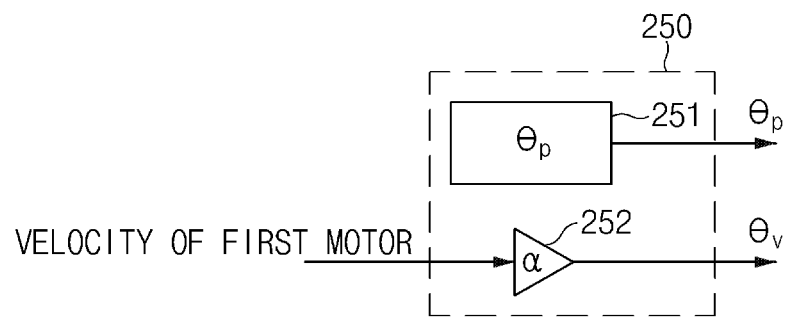
FIG. 5 is an exemplary diagram illustrating a structure of a phase shift amount operation unit in detail according to an exemplary embodiment of the present disclosure.

FIG. 5 is an exemplary diagram illustrating a structure of the phase shift amount operation unit in detail according to an exemplary embodiment of the present disclosure. As illustrated in FIG. 5, the phase shift amount operation unit 250 according to the present disclosure may include a first operator 251 and a second operator 252. In particular, the first operator 251 may be configured to adjust a compensation value $\theta_p$ for compensating for a phase difference due to a transfer delay to the first motor 112 from the vibration extractor 213. The second operator 252 may be configured to adjust a compensation value $\theta_v$ for compensating for a phase delay generated by the vibration extractor 213.

Figure 6:
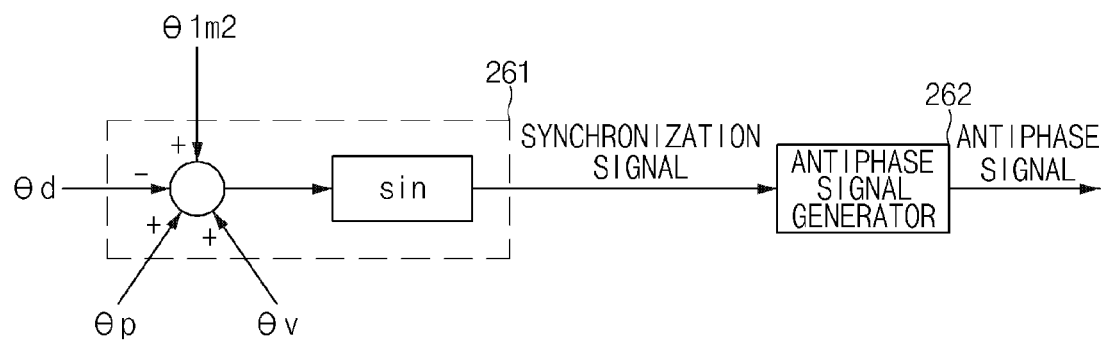
FIG. 6 is an exemplary diagram illustrating a structure of an antiphase signal generation unit in detail according to an exemplary embodiment of the present disclosure.

FIG. 6 is an exemplary diagram illustrating a structure of the antiphase signal generation unit in detail according to an exemplary embodiment of the present disclosure. As illustrated in FIG. 6, the antiphase signal generation unit 260 according to the present disclosure may include a synchronization signal generator 261 and an antiphase signal generator 262. Particularly, the synchronization signal generator 261 may be configured to generate a synchronization signal that is synchronized with the vibration signal extracted by the vibration extraction unit 210 based on the phase $\theta 1m2$ generated by the reference signal generation unit 220, the phase $\theta_d$ detected by the phase determination unit 240, and the compensation value $\theta_p$ operated by the phase shift amount operation unit 250.

In other words, the synchronization signal generator 261 may be configured to generate a synchronization signal with a phase of a result obtained by adding the compensation value $\theta_p$ adjusted by the phase shift amount operation unit 250 to a result obtained by subtracting the phase $\theta_d$ detected by the phase determination unit 240 from the phase $\theta 1m2$ generated by the reference signal generation unit 220. Specifically, a compensation value $\theta_v$ for compensating for phase delay generated by the vibration extractor 213 may be further added. In addition, the antiphase signal generator 262 may be configured to generate an antiphase signal of the synchronization signal generated by the synchronization signal generator 261.

Figure 7:
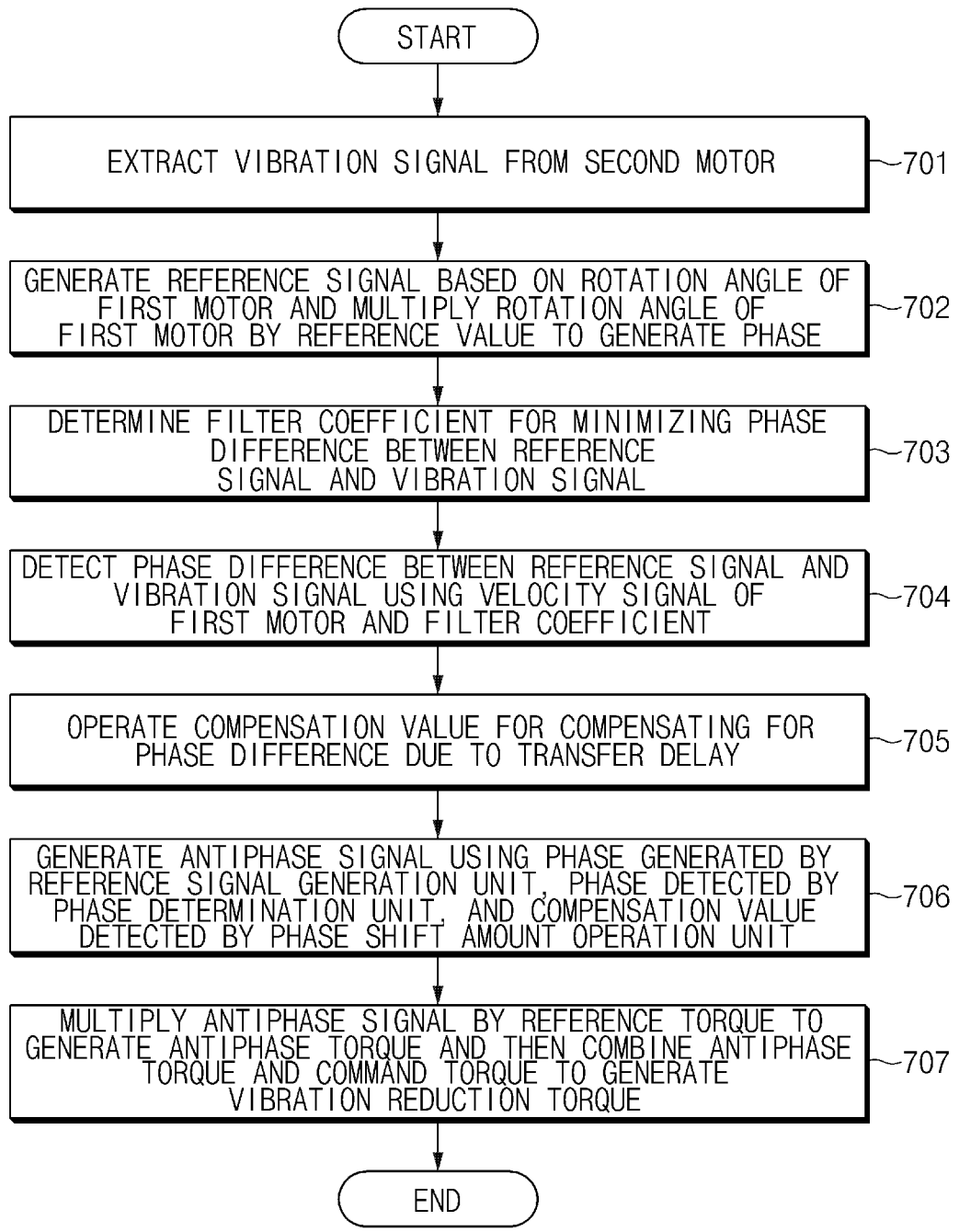
FIG. 7 is an exemplary flowchart of an active vibration reduction control method of a hybrid vehicle according to an exemplary embodiment of the present disclosure.

FIG. 7 is an exemplary flowchart of an active vibration reduction control method of a hybrid vehicle according to an exemplary embodiment of the present disclosure and illustrates an active vibration reduction control method of a hybrid vehicle in which a first motor, a tortional damper, an engine, a belt-pulley, and a second motor may be sequentially connected.

First, the vibration extraction unit 210 may be configured to extract a vibration signal from the second motor 116 (701). Then, the reference signal generation unit 220 may be configured to generate a reference signal based on a rotation angle of the first motor 112 and multiply the rotation of the first motor 112 by a reference value to generate a phase (e.g., a double rotation angle) (702). The coefficient determination unit 230 may then be configured to determine a filter coefficient for minimizing a phase difference between the reference signal generated by the reference signal generation unit 220 and the vibration signal extracted by the vibration extraction unit 210 (703).

Furthermore, the phase determination unit 240 may be configured to differentiate a rotation angle of the first motor 112 to calculate a velocity signal and detect a phase difference between the reference signal generated by the reference signal generation unit 220 and the vibration signal extracted by the vibration extraction unit 210 using the calculated velocity signal and the filter coefficient determined by the coefficient determination unit 230 (704). The phase shift amount operation unit 250 may be configured to adjust a compensation value $\theta_p$ for compensating for a phase difference due to a transfer delay up to the first motor 112 from the vibration extractor 213 (705).

In addition, the antiphase signal generation unit 260 may be configured to generate an antiphase signal using a phase $\theta 1m2$ generated by the reference signal generation unit 220, a phase $\theta_d$ detected by the phase determination unit 240, and a compensation value $\theta_p$ adjusted by the phase shift amount operation unit 250 (706). The torque generation unit 270 may be configured to multiply the antiphase signal generated by the antiphase signal generation unit 260 by reference torque to generate antiphase torque and then combine the antiphase torque and command torque to generate vibration reduction torque (707). The command torque refers to command torque from an upper controller (e.g., the HCU 124 or an accelerator pedal (not shown)).

The aforementioned method according to the present disclosure is capable of being written as computer programs. Codes and code segments constituting the computer program may be easily understood by those skilled in the art to which the present disclosure pertains. The written computer program may be stored in computer readable recording media (information storage media) such that the computer program is read and executed by a computer to implement embodiments of the present disclosure. In addition, the recording media includes any type of computer readable recording media.

As described above, according to the exemplary embodiments of the present disclosure, a hybrid vehicle in which a first motor, a tortional damper, an engine, a connector (a belt-pulley, a chain, a gear, and so on), and a second motor are sequentially connected may be configured to generate a reference signal (a unit sine wave) of the first motor, corresponding to a vibration signal extracted from the second motor and then adjust the amplitude and phase of the reference signal based on the frequency characteristic of a drive system transfer function to generate vibration reduction torque of the first motor, thereby actively reducing vibration generated due to engine explosion.

The present disclosure may more effectively reduce vibration generated due to engine explosion to achieve a more comfortable ride feel for a driver. In addition, the present disclosure may reduce vibration using a general hybrid system without any additional structure, thereby reducing vibration without additional cost.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. An active vibration reduction control apparatus of a vehicle in which a first motor, a torsional damper, an engine, a connector, and a second motor are sequentially connected, the apparatus comprising:
    a memory configured to store program instructions; and
    a processor configured to execute the program instructions, the program instructions when executed configured to:
    extract a vibration signal from the second motor;
    generate a reference signal and a phase based on a rotation angle of the first motor;
    determine a filter coefficient for minimizing a phase difference between the generated reference signal and the extracted vibration signal;
    detect the phase difference between the reference signal and the vibration signal using a velocity signal of the first motor and the determined filter coefficient;
    adjust a phase for compensating for delay;
    generate an antiphase signal using the generated phase, the detected phase, and the adjusted phase; and
    multiply the antiphase signal by a reference torque to generate antiphase torque and to combine the antiphase torque and command torque.

2. The apparatus according to claim 1, wherein the programs when executed are further configured to:
    measure a rotation angle of the second motor;
    differentiate the measured rotation angle to calculate a velocity signal; and
    filter the velocity signal calculated by the velocity calculator to extract a vibration signal.

3. The apparatus according to claim 1, wherein the program instructions when executed are further configured to:
    measure a rotation angle of the first motor;
    multiply the measured rotation angle of the first motor by 2 to calculate a double rotation angle; and
    generate the reference signal using the calculated double rotation angle.

4. The apparatus according to claim 3, wherein the program instructions when executed are further configured to:
    differentiate the measured rotation angle to calculate the velocity signal; and
    detect the phase difference between the reference signal and the vibration signal using the calculated velocity signal and the determined filter coefficient.

5. The apparatus according to claim 1, wherein the program instructions when executed are further configured to:
    filter the generated reference signal using an updated filter coefficient;
    calculate the phase difference between the generated reference signal and the extracted vibration signal extracted; and
    calculate the filter coefficient for minimizing the calculated phase difference.

6. The apparatus according to claim 1, wherein the program instructions when executed are further configured to:
    generate a synchronization signal synchronized with the extracted vibration signal based on the generated phase generated, the determined phase, and the adjusted phase; and
    generate an antiphase signal of the generated synchronization signal.

7. The apparatus according to claim 1, wherein the reference torque is a pre-set constant.

8. The apparatus according to claim 1, wherein the reference torque is a predetermined ratio of total torque applied to an engine torque.

9. An active vibration reduction control method of a vehicle in which a first motor, a torsional damper, an engine, a connector, and a second motor are sequentially connected, the method comprising:
    extracting, by a controller, a vibration signal from the second motor;
    measuring, by the controller, a rotation angle of the first motor using a first resolver;
    generating, by the controller, a reference signal and a phase based on the measured rotation angle of the first motor;
    determining, by the controller, a filter coefficient for minimizing a phase difference between the generated reference signal and the extracted vibration signal;
    differentiating, by the controller, the measure rotation angle of the first motor to calculate a velocity signal;
    detecting, by the controller, the phase difference between the reference signal and the vibration signal using the calculated velocity signal of the first motor and the determined filter coefficient;
    adjusting, by the controller, a phase for compensating for delay;
    generating, by the controller, an antiphase signal using the generated phase, the detected phase, and the adjusted phase; and
    multiplying, by the controller, the antiphase signal by reference torque to generate antiphase torque and then combining the antiphase torque and command torque.

10. The method according to claim 9, wherein the extracting of the vibration includes:
    measuring, by the controller, a rotation angle of the second motor using a second resolver;
    differentiating, by the controller, the measured rotation angle to calculate a velocity signal; and
    filtering, by the controller, the calculated velocity signal to extract a vibration signal.

11. The method according to claim 9, wherein the generating of the reference signal includes:
    multiplying, by the controller, the measured rotation angle of the first motor by 2 to calculate a double rotation angle; and
    generating, by the controller, the reference signal using the calculated double rotation angle.

12. The method according to claim 11, wherein the generating of the reference signal includes generating a unit sine wave as the reference signal.

13. The method according to claim 9, wherein the generating of the antiphase signal includes;
    generating, by the controller, a synchronization signal synchronized with the extracted vibration signal based on the generated phase t, the determined phase, and the adjusted phase; and
    generating, by the controller, an antiphase signal of the generated synchronization signal.

14. The method according to claim 9, wherein the reference torque is a predetermined ratio of total torque applied to an engine torque.

15. The method according to claim 9, wherein the reference torque is a pre-set constant.

* * * * *